US008887190B2

(12) United States Patent
McDonald et al.

(10) Patent No.: US 8,887,190 B2
(45) Date of Patent: Nov. 11, 2014

(54) MULTIMEDIA SYSTEM GENERATING AUDIO TRIGGER MARKERS SYNCHRONIZED WITH VIDEO SOURCE DATA AND RELATED METHODS

(75) Inventors: Robert McDonald, Palm Bay, FL (US); Christopher T. Dunkel, Palm Bay, FL (US); John Heminghous, Melbourne, FL (US); Aric Peterson, Palm Bay, FL (US); Tariq Bakir, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 1048 days.

(21) Appl. No.: 12/473,321

(22) Filed: May 28, 2009

(65) Prior Publication Data

US 2010/0306796 A1 Dec. 2, 2010

(51) Int. Cl.
| | |
|---|---|
| *H04N 7/173* | (2011.01) |
| *G07G 1/00* | (2006.01) |
| *G06F 17/30* | (2006.01) |
| *G06F 17/00* | (2006.01) |
| *H04N 7/16* | (2011.01) |

(52) U.S. Cl.
CPC ................................. *G06F 17/30781* (2013.01)
USPC ................ 725/18; 725/19; 704/235; 704/251

(58) Field of Classification Search
CPC ................................................. G06F 17/30781
USPC ............... 725/18, 19; 704/235, 268, 236, 251
See application file for complete search history.

(56) References Cited

U.S. PATENT DOCUMENTS

| | | | | |
|---|---|---|---|---|
| 5,649,060 | A  * | 7/1997 | Ellozy et al. ................... | 704/278 |
| 5,721,827 | A  * | 2/1998 | Logan et al. ................... | 709/217 |
| 6,173,317 | B1 * | 1/2001 | Chaddha et al. .............. | 709/219 |
| 6,336,093 | B2   | 1/2002 | Fasciano ....................... | 704/278 |
| 6,449,653 | B2 * | 9/2002 | Klemets et al. ................ | 709/231 |
| 6,499,016 | B1 * | 12/2002 | Anderson ...................... | 704/275 |
| 6,748,421 | B1 * | 6/2004 | Ozkan et al. ................... | 709/206 |
| 6,810,146 | B2 * | 10/2004 | Loui et al. ...................... | 382/173 |
| 7,035,807 | B1   | 4/2006 | Brittain et al. ................ | 704/278 |
| 7,225,131 | B1 * | 5/2007 | Bangalore et al. ............ | 704/270 |
| 7,559,017 | B2 * | 7/2009 | Datar et al. .................... | 715/230 |
| 7,747,943 | B2 * | 6/2010 | Bargeron et al. .............. | 715/235 |
| 8,332,886 | B2 * | 12/2012 | Lanza et al. .................... | 725/32 |
| 2001/0023436 | A1 * | 9/2001 | Srinivasan et al. ............ | 709/219 |
| 2002/0056082 | A1 * | 5/2002 | Hull et al. ........................... | 725/1 |
| 2002/0059342 | A1   | 5/2002 | Gupta et al. ................... | 707/512 |
| 2002/0099552 | A1 * | 7/2002 | Rubin et al. ................... | 704/270 |

(Continued)

FOREIGN PATENT DOCUMENTS

| | | | |
|---|---|---|---|
| WO | 99/36918 | 7/1999 | ............ G11B 27/034 |
| WO | 2007/073347 | 6/2007 | .............. G06F 17/30 |

*Primary Examiner* — Pankaj Kumar
*Assistant Examiner* — Reuben M Brown
(74) *Attorney, Agent, or Firm* — Allen, Dyer, Doppelt, Milbrath & Gilchrist, P.A.

(57) ABSTRACT

A multimedia system may include at least one audio comment input device configured to permit at least one commentator to generate audio comment data based upon viewing video data from a video source. Furthermore, a media processor may cooperate with the at least one audio comment input device and be configured to process video source data and audio comment data and generate therefrom audio trigger markers synchronized with the video source data for predetermined audio triggers in the audio comment data, and combine the video source data, the audio comment data, and the audio trigger markers into a media data stream.

13 Claims, 9 Drawing Sheets

(56) References Cited

U.S. PATENT DOCUMENTS

| | | | |
|---|---|---|---|
| 2004/0021685 A1 | 2/2004 | Denoue et al. | 345/721 |
| 2004/0098754 A1 | 5/2004 | Vella et al. | 725/135 |
| 2005/0262542 A1 | 11/2005 | DeWeese et al. | 725/106 |
| 2006/0111918 A1 | 5/2006 | Ducheneaut et al. | 704/278 |
| 2006/0174293 A1* | 8/2006 | Ducheneaut et al. | 725/90 |
| 2008/0059281 A1* | 3/2008 | Tower et al. | 705/10 |
| 2008/0059580 A1 | 3/2008 | Kalinowski et al. | 709/204 |
| 2008/0281592 A1 | 11/2008 | McKoen et al. | 704/235 |
| 2009/0210779 A1* | 8/2009 | Badoiu et al. | 715/230 |
| 2011/0173141 A1* | 7/2011 | Campbell et al. | 706/12 |

* cited by examiner

MULTIMEDIA SYSTEM GENERATING AUDIO TRIGGER MARKERS SYNCHRONIZED WITH VIDEO SOURCE DATA AND RELATED METHODS

FIELD OF THE INVENTION

The present invention relates to the field of media systems, and, more particularly, to multimedia systems and methods for processing video, audio, and other associated data.

BACKGROUND OF THE INVENTION

The transition from analog to digital media systems has allowed the combination of previously dissimilar media types, such as chat text with video, for example. One exemplary system which combines text chatting with video is set forth in U.S. Pat. Pub. No. 2005/0262542 to DeWeese et al. This reference discloses a television chat system that allows television viewers to engage in real-time communications in chat groups with other television viewers while watching television. Users of the television chat system may engage in real-time communications with other users who are currently watching the same television program or channel.

In addition, the use of digital media formats has enhanced the ability to generate and store large amounts of multimedia data. Yet, with increased amounts of multimedia data comes greater challenges in processing the data. Various approaches have been developed for enhancing video processing. One such approach is set forth in U.S. Pat. No. 6,336,093 to Fasciano. Audio associated with a video program, such as an audio track or live or recorded commentary, may be analyzed to recognize or detect one or more predetermined sound patterns, such as words or sound effects. The recognized or detected sound patterns may be used to enhance video processing, by controlling video capture and/or delivery during editing, or to facilitate selection of clips or splice points during editing.

U.S. Pat. Pub. No. 2008/0281592 to McKoen et al. discloses a method and apparatus for annotating video content with metadata generated using speech recognition technology. The method begins with rendering video content on a display device. A segment of speech is received from a user such that the speech segment annotates a portion of the video content currently being rendered. The speech segment is converted to a text-segment and the text-segment is associated with the rendered portion of the video content. The text segment is stored in a selectively retrievable manner so that it is associated with the rendered portion of the video content.

Despite the advantages provided by such systems, further improvements may be desirable for managing and storing multimedia data in a helpful manner to users.

SUMMARY OF THE INVENTION

In view of the foregoing background, it is therefore an object of the present invention to provide a system and related methods for multimedia data processing.

This and other objects, features, and advantages are provided by a multimedia system which may include at least one audio comment input device configured to permit at least one commentator to generate audio comment data based upon viewing video data from a video source. Furthermore, a media processor may cooperate with the at least one audio comment input device and be configured to process video source data and audio comment data, and generate therefrom audio trigger markers synchronized with the video source data for predetermined audio triggers in the audio comment data. The media processor may be further configured to combine the video source data, the audio comment data, and the audio trigger markers into a media data stream. As such, the system provides a readily searchable archive of the shared text comment data, which is advantageously correlated in time with the video source data.

More particularly, the at least one audio comment input device may comprise a plurality thereof, and the media processor may be further configured to generate the audio trigger markers based upon multiple occurrences of predetermined audio triggers within a set time, such as from different audio comment input devices, for example. The media server may further be configured to store portions of the media data stream associated with occurrences of the audio trigger markers.

By way of example, the media processor may combine the video data feed, the audio data feed, and the audio trigger markers by multiplexing to generate the media data stream. Furthermore, the media data stream may comprise a Moving Pictures Experts Group (MPEG) transport stream, for example. In addition, the media processor may be further configured to generate notifications based upon occurrences of the predetermined audio triggers in the audio comment data.

The multimedia system may further include a plurality of text comment input devices configured to permit a plurality of commentators to generate shared text comment data based upon viewing the video data. Furthermore, the media processor may be further configured to process the video source data and shared text comment data and generate therefrom a database comprising shared text comment data indexed in time with the video source data. Moreover, the database may be searchable by text keywords to locate corresponding portions of the video source data. The media processor may comprise a media server, for example, which may include a processor and a memory cooperating therewith.

A related multimedia data processing method may include generating audio comment data using at least one audio comment input device configured to permit at least one commentator to comment upon viewing video data from a video source. The method may further include processing video source data and audio comment data and generating therefrom audio trigger markers synchronized with the video source data for predetermined audio triggers in the audio comment data using a media processor. Furthermore, the video source data, the audio comment data, and the audio trigger markers may be combined into a media data stream using the media processor.

A related physical computer-readable medium may have computer-executable instructions for causing a media processor to perform steps including processing the video source data and audio comment data, and generating therefrom audio trigger markers synchronized with the video source data for predetermined audio triggers in the audio comment data using a media processor. A further step may include combining the video source data, the audio comment data, and the audio trigger markers into a media data stream.

DETAILED DESCRIPTION OF THE PREFERRED EMBODIMENTS

Figure 1:
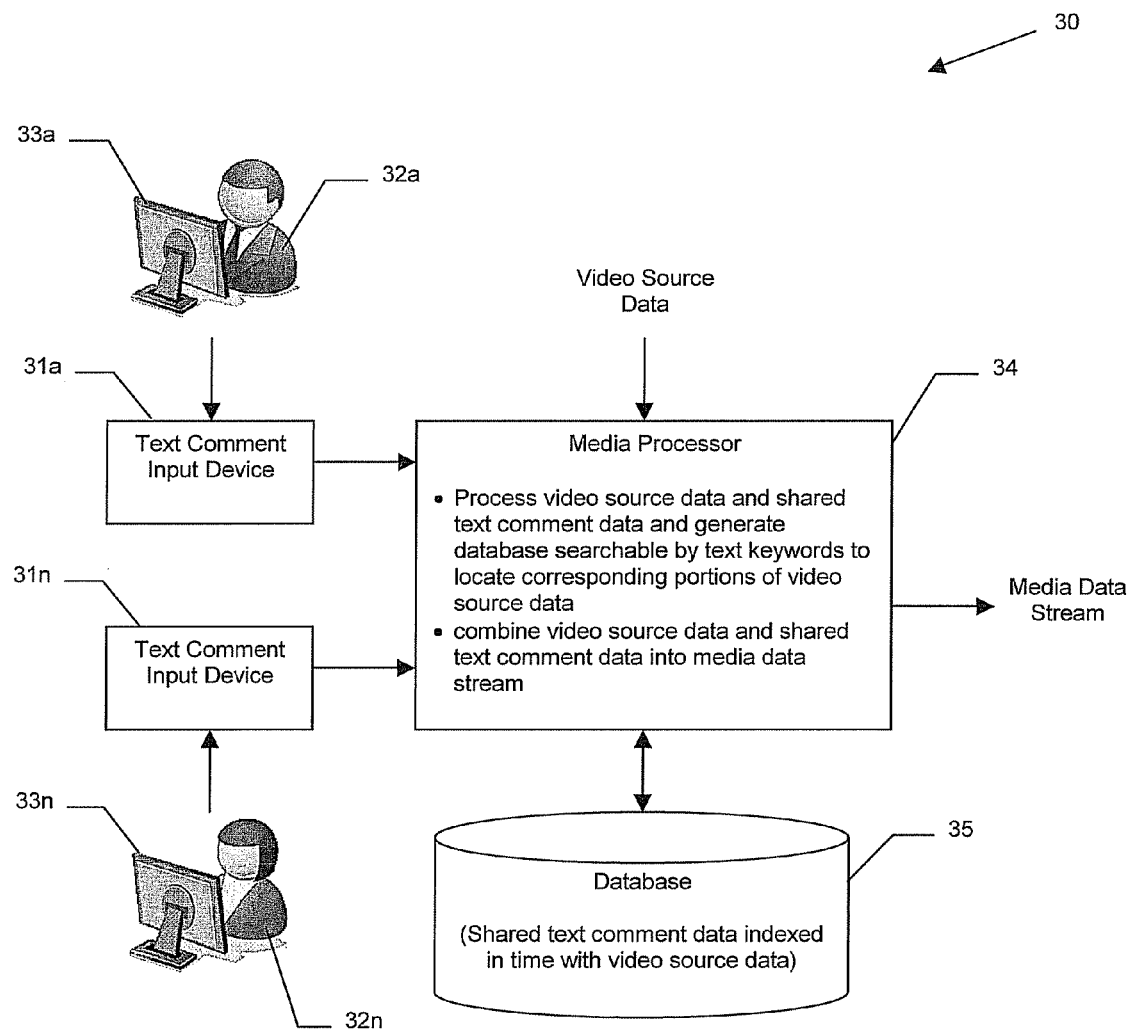
FIG. 1 is a schematic block diagram of an exemplary multimedia system in accordance with the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

As will be appreciated by those skilled in the art, portions of the present invention may be embodied as a method, data processing system, or computer program product. Accordingly, these portions of the present invention may take the form of an entirely hardware embodiment, an entirely software embodiment on a physical computer-readable medium, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring initially to FIGS. 1-5, a multimedia system 30 and associated method aspects are first described. In particular, the system 30 illustratively includes a plurality of text comment input devices 31a-31n which are configured to permit a plurality of commentators 32a-32n to generate shared text comment data based upon viewing video data from a video source, at Blocks 50-51. By way of example, the text comment input devices 31a-31n may be desktop or laptop computers, etc., and the commentators 32a-32n may view the video data on respective displays 33a-33n, although other suitable configurations may also be used, as will be appreciated by those skilled in the art. As used herein, "video data" is meant to include full motion video as well as motion imagery, as will be appreciated by those skilled in the art.

The system 30 further illustratively includes a media processor 34 which cooperates with the text comment input devices 31a-31n and is advantageously configured to process the video source data and shared text comment data and generate therefrom a database 35 including shared text comment data indexed in time with the video source data so that the database is searchable by text keywords to locate corresponding portions of the video source data, at Block 52. The media processor 34 may be further configured to combine the video source data and the shared text comment data into a media data stream, such as a Moving Pictures Experts Group (MPEG) (e.g., MPEG2) transport stream, for example, at Block 53, thus concluding the method illustrated in FIG. 4 (Block 54).

Figure 2:
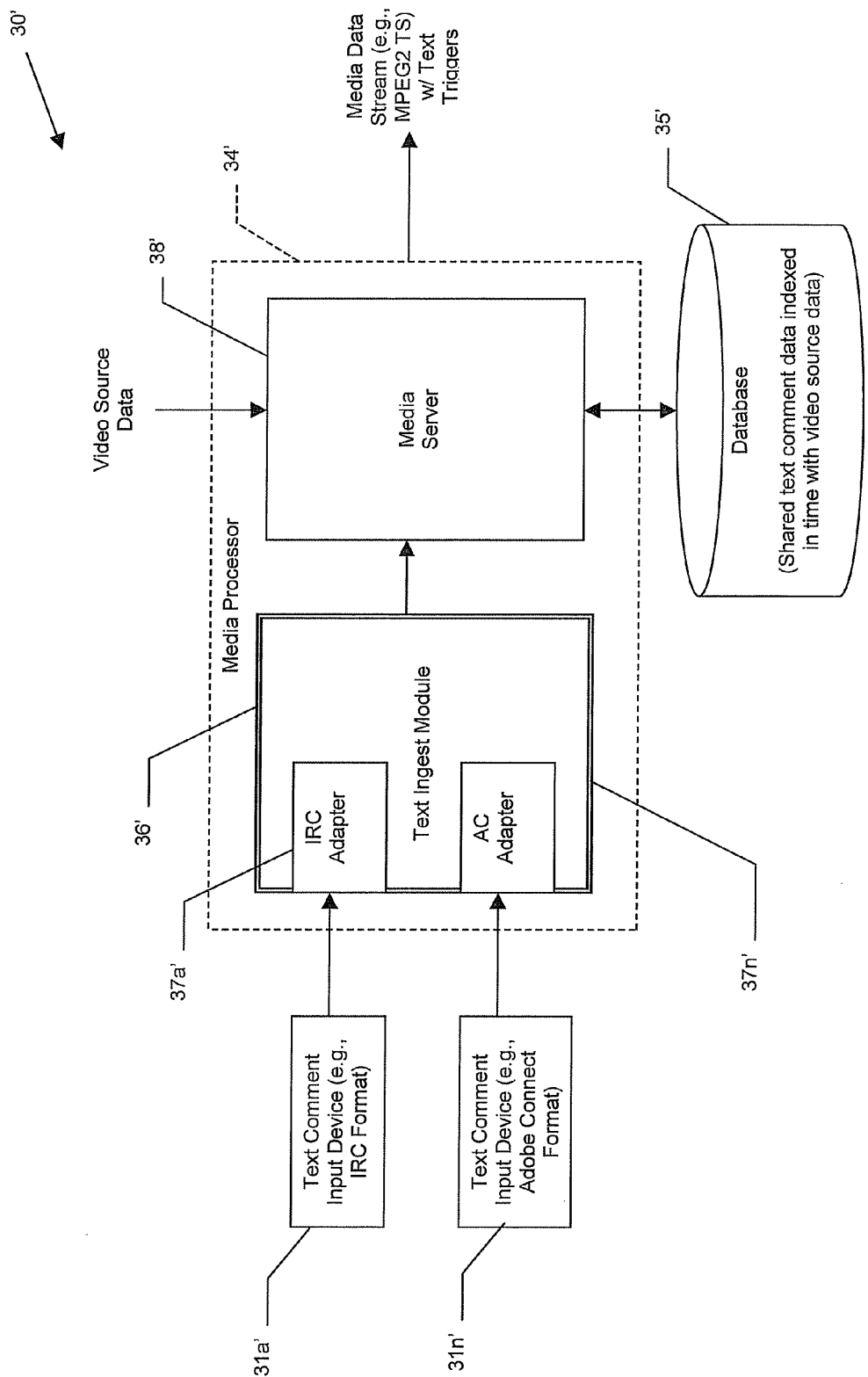
FIG. 2 is a schematic block diagram of an alternative embodiment of the system of FIG. 1.
Figure 3:
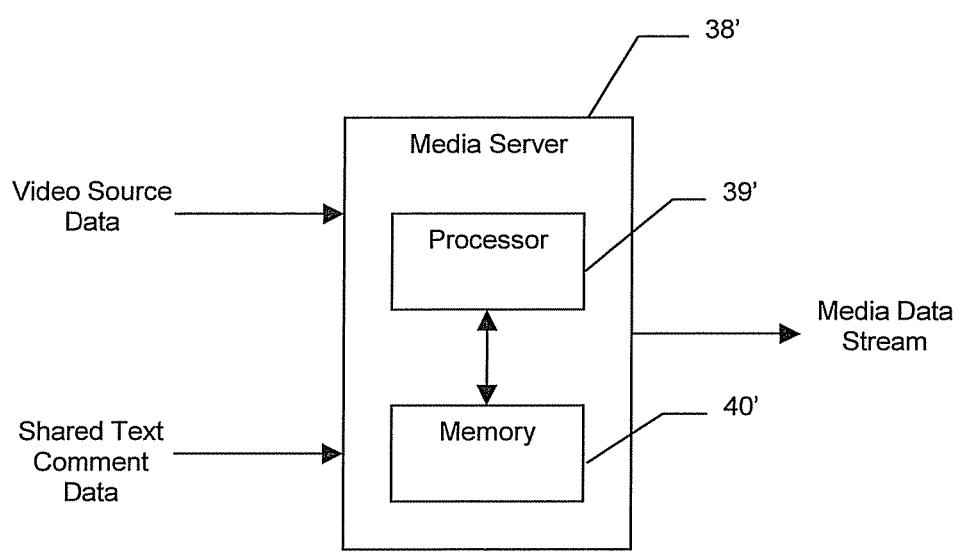
FIG. 3 is a schematic block diagram illustrating an exemplary embodiment of the media server of FIG. 2 in greater detail.
Figure 4:
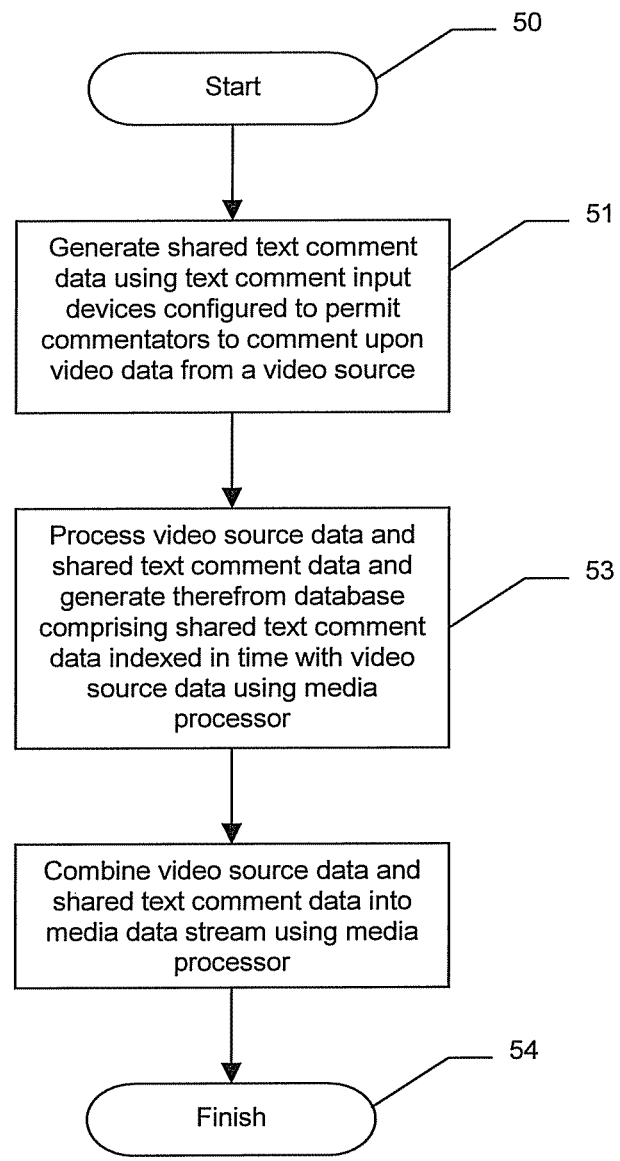
FIGS. 4 and 5 are flow diagrams illustrating method aspects associated with the systems of FIGS. 1 and 2.

In the embodiment illustrated in FIG. 2, the text comment input devices 31a' and 31n' are configured to generate text data in different respective text comment formats, here two different chat text formats. More particularly, the text comment input device 31a' generates chat text data in accordance with an Internet Relay Chat (IRC) format, while the text comment input device 31n' generates chat text in accordance with an Adobe® Acrobat® Connect™ (AC) format, as will be appreciated by those skilled in the art. However, it will also be appreciated that other suitable text formats beyond these exemplary formats may also be used.

As such, the media processor 34' may further illustratively include a text ingest module 36' for adapting the different text comment formats into a common text comment format for use by the media processor 34'. More particularly, the text ingest module 36 may include a respective adapter 37a'-37n' for each of the different text comment formats (IRC, AC, etc.). Thus, the text ingest module 36' advantageously may extract text input data, such as chat data, from a variety of different systems and convert or adapt the various formats to an appropriate common format for use by a media server 38', which performs the above-noted operations. In the example shown in FIG. 3, the media server illustratively includes a processor 39' and a memory 40' cooperating therewith for performing these operations.

Figure 5:
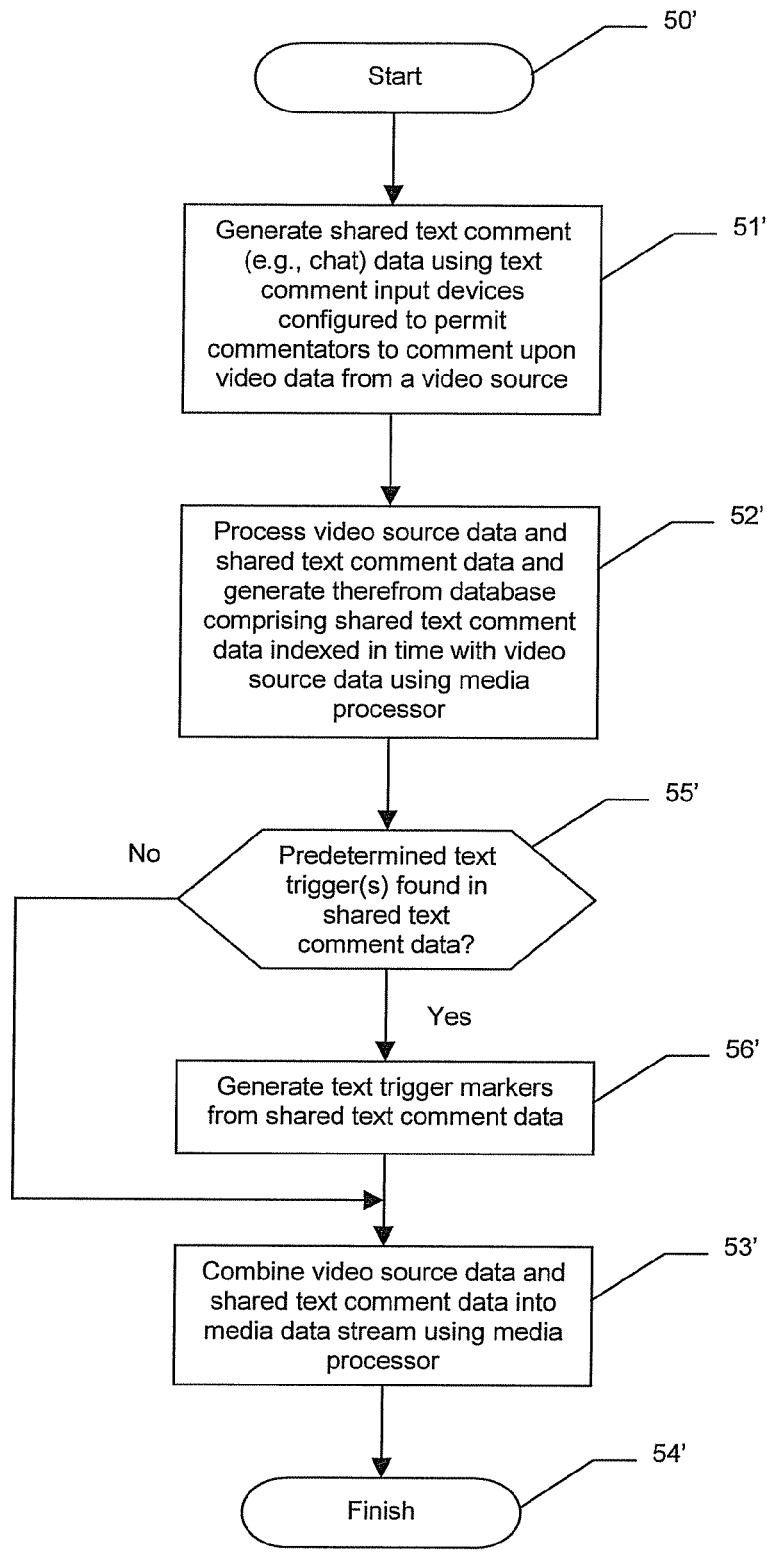
Figure 6:
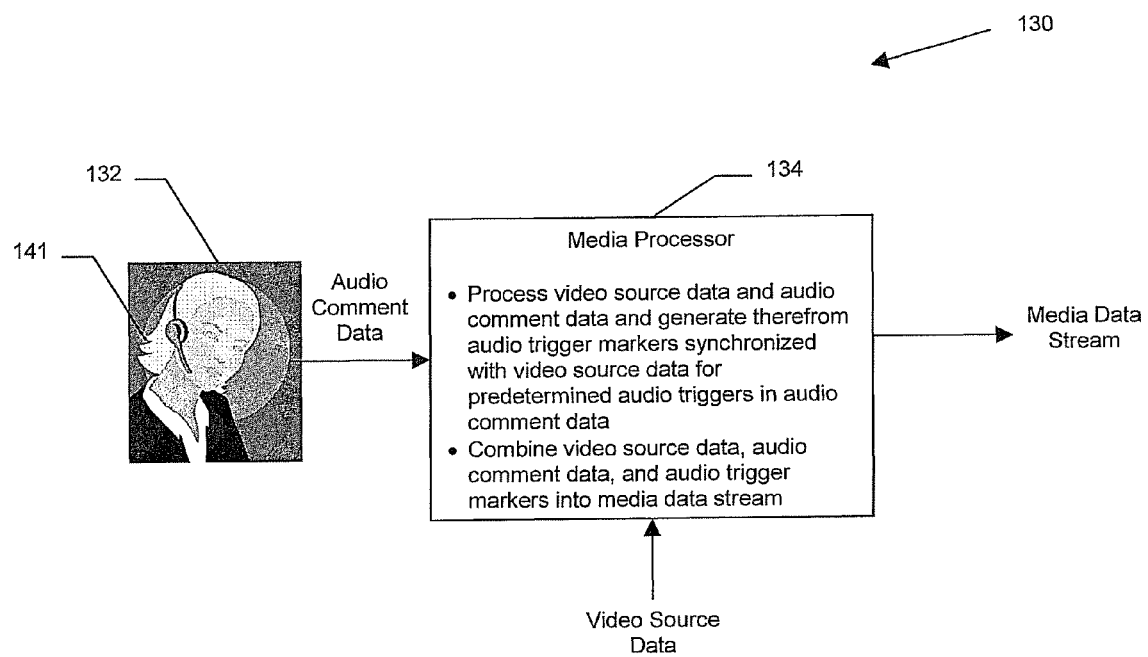
FIG. 6 is a schematic block diagram of another exemplary multimedia system in accordance with the invention.

In some embodiments, the media server 38' may be further configured to generate text trigger markers from the shared text comment data for predetermined text triggers in the shared text comment data, at Blocks 55'-56' (FIG. 5). For example, upon the occurrence of one or more predefined text triggers in the shared text comment data within a set time, such as a predefined keyword(s) or phrase, a text trigger marker is generated which is synchronized with the video source data (e.g., it is marked with the timestamp of the video data at the time of occurrence). The text trigger markers may also be stored in the database 35 in some embodiments.

Notifications may also be generated (e.g., email notifications, popup windows, etc.) based upon occurrences of the predefined text triggers as well to alert the appropriate supervisors or other personnel of the occurrence of the predetermined text triggers, if desired.

The media processor 34 may perform media ingest using formats such as MPEG2, MPEG4, H264, JPEG2000, etc., for example. Moreover, functions such as archival, search, and retrieval/export may be performed using an MPEG transport or program stream, Material exchange Format (MXF), Advanced Authoring Format (AAF), JPEG 2000 Interactive Protocol (JPIP), etc. Other suitable formats may also be used, as will be appreciated by those skilled in the art. The database 35 may be implemented using various commercial database systems, as will also be appreciated by those skilled in the art.

The system 30 may therefore advantageously be used for applications in which one or more commentators are to view video data and comment, and there is a need to provide a readily searchable archive of the text data which is correlated in time with the video data. This advantageously allows users to quickly locate pertinent portions of potentially large archives of video, and avoid searching through or viewing long portions or periods of unimportant video and text. The system may be used for various video applications, such as viewing of television shows or movies, intelligence analysis, etc. Moreover, the system 30 may advantageously be used to generate summary reports from the text stored in the database 35'. For example, in a television or movie viewing context, users may chat while watching a movie about what they like or do not like. A summary report of how many predetermined "like" or "dislike" words were used in conjunction with certain scenes or portions of the video, an actor, etc., may be generated by the media processor 34' or other computing device with access to the database 35'.

A related physical computer-readable medium may have computer-executable instructions for causing the media processor 34 to perform steps including processing the video source data and shared text comment data and generating therefrom the database 35 comprising shared text comment data indexed in time with the video source data, with the database being searchable by text keywords to locate corresponding portions of the video source data. A further step may include combining the video source data and the shared text comment data into a media data stream.

Turning now additionally to FIGS. 6-9, a related multimedia system 130 is now described. By way of background, despite the greater ease of generating and archiving video noted above, there often are not efficient mechanisms for adding audio annotations or audio triggers from a video analyst or commentator without adding unwanted "chatter" to the multimedia file. For example, intelligence analysts watch streams of video data for hours on end and comment about what they are seeing in the video stream. Much of the commentary may not be particularly relevant or of interest, but those instances when the commentator or analyst identifies an item of interest may need to be reviewed by others. However, finding these specific points of interest within many hours of archived audio/video data can be time consuming and cumbersome.

Speech recognition systems are currently in use which can monitor speech data for special keywords. On the other hand, some media processing systems may be used to multiplex audio and tag phrases into a media stream, such as an MPEG2 transport stream, for example. The system 130, however, advantageously allows for monitoring of speech from a video analyst for special keywords or triggers as they happen (i.e., in real time), recording of trigger markers, and combining or multiplexing of the trigger markers into a media container, such as an MPEG2 transport stream, yet while remaining separate from the video and audio (i.e., not overwritten on the video or data feeds).

More particularly, the multimedia system illustratively includes one or more audio comment input devices 141 (e.g., microphones) configured to permit a commentator(s) 132 to generate audio comment data based upon viewing video data from a video source, at Blocks 150-151. Furthermore, a media processor 134 may cooperate with the audio comment input device(s) 141 and be configured to process video source data and audio comment data, and generate therefrom audio trigger markers synchronized with the video source data for predetermined audio triggers in the audio comment data, at Block 152. The media processor 134 may be further configured to combine (e.g., multiplex) the video source data, the audio comment data, and the audio trigger markers into a media data stream, at Block 153, thus concluding the method illustrated in FIG. 8 (Block 154). By way of example, the media processor 134' may combine the video data feed, the audio data feed, and the audio trigger markers by multiplexing to generate the media data stream, such as multiplexing them into an MPEG2 transport stream, for example, although other suitable formats may also be used.

Figure 7:
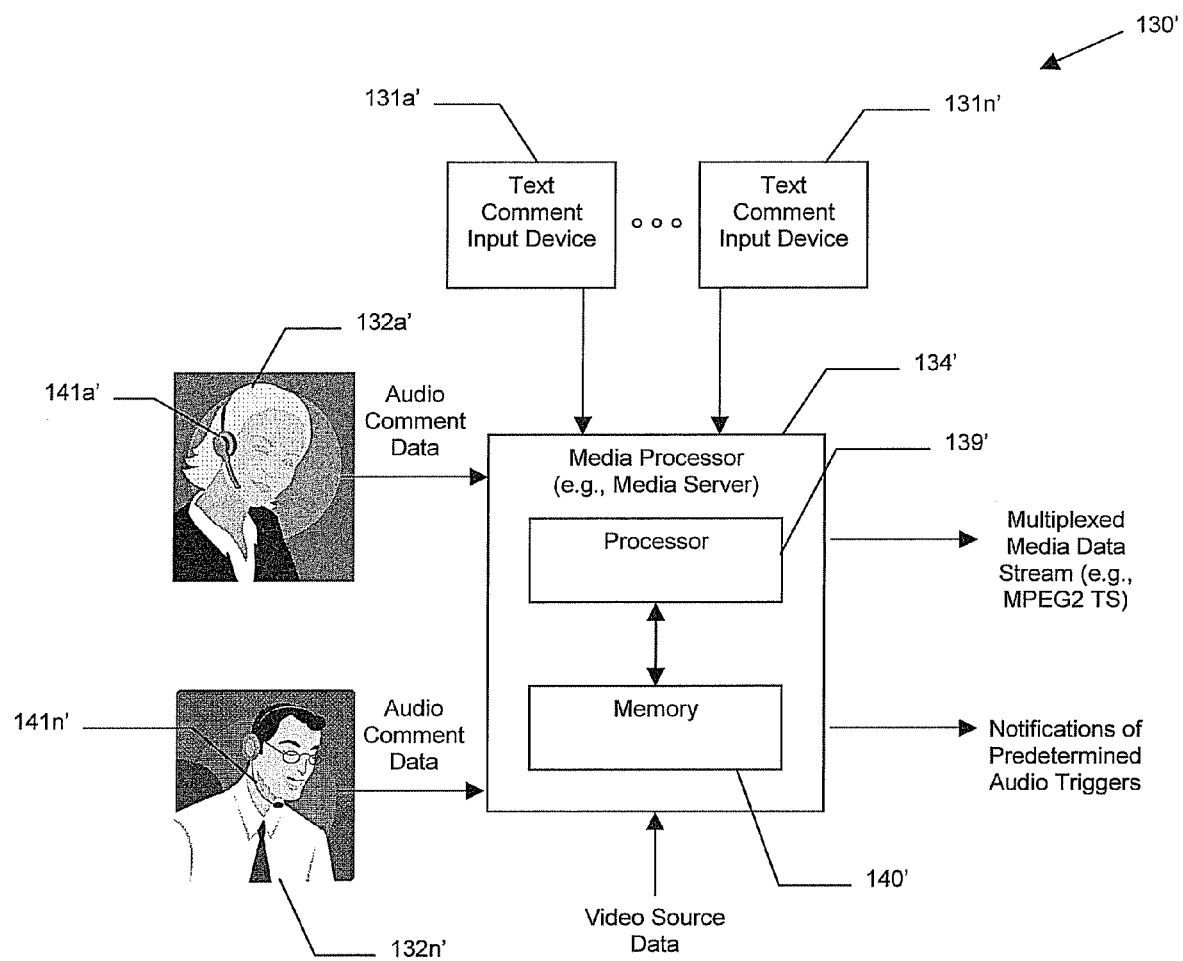
FIG. 7 is a schematic block diagram of an alternative embodiment of the system of FIG. 6.
Figure 8:
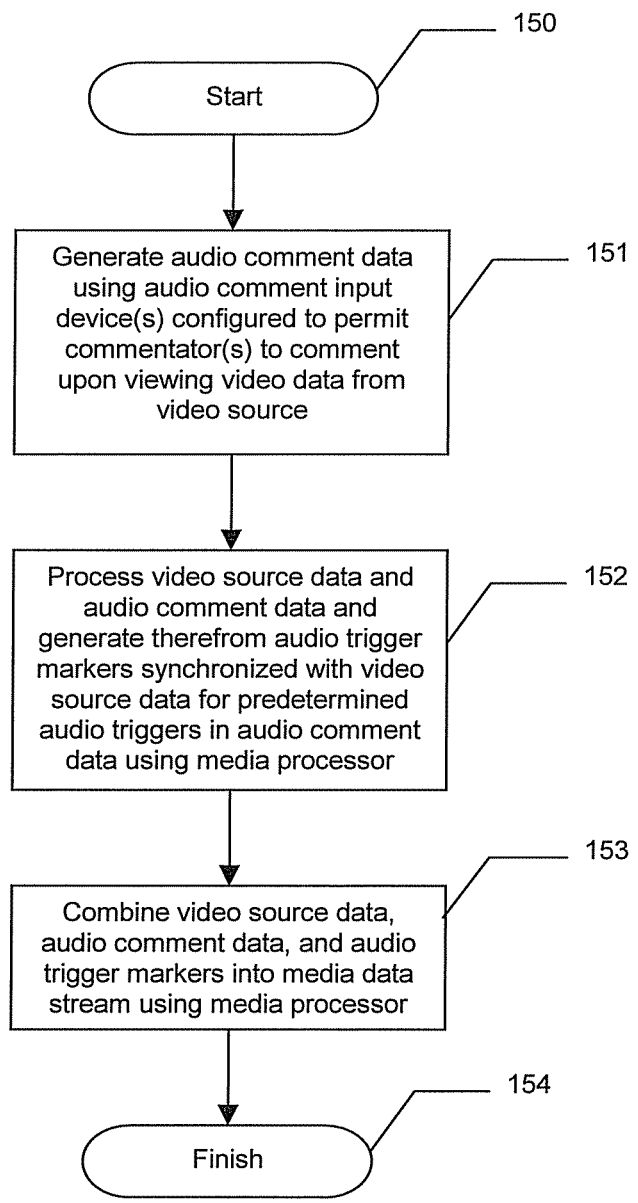
FIGS. 8 and 9 are flow diagrams illustrating method aspects associated with the systems of FIGS. 6 and 7.
Figure 9:
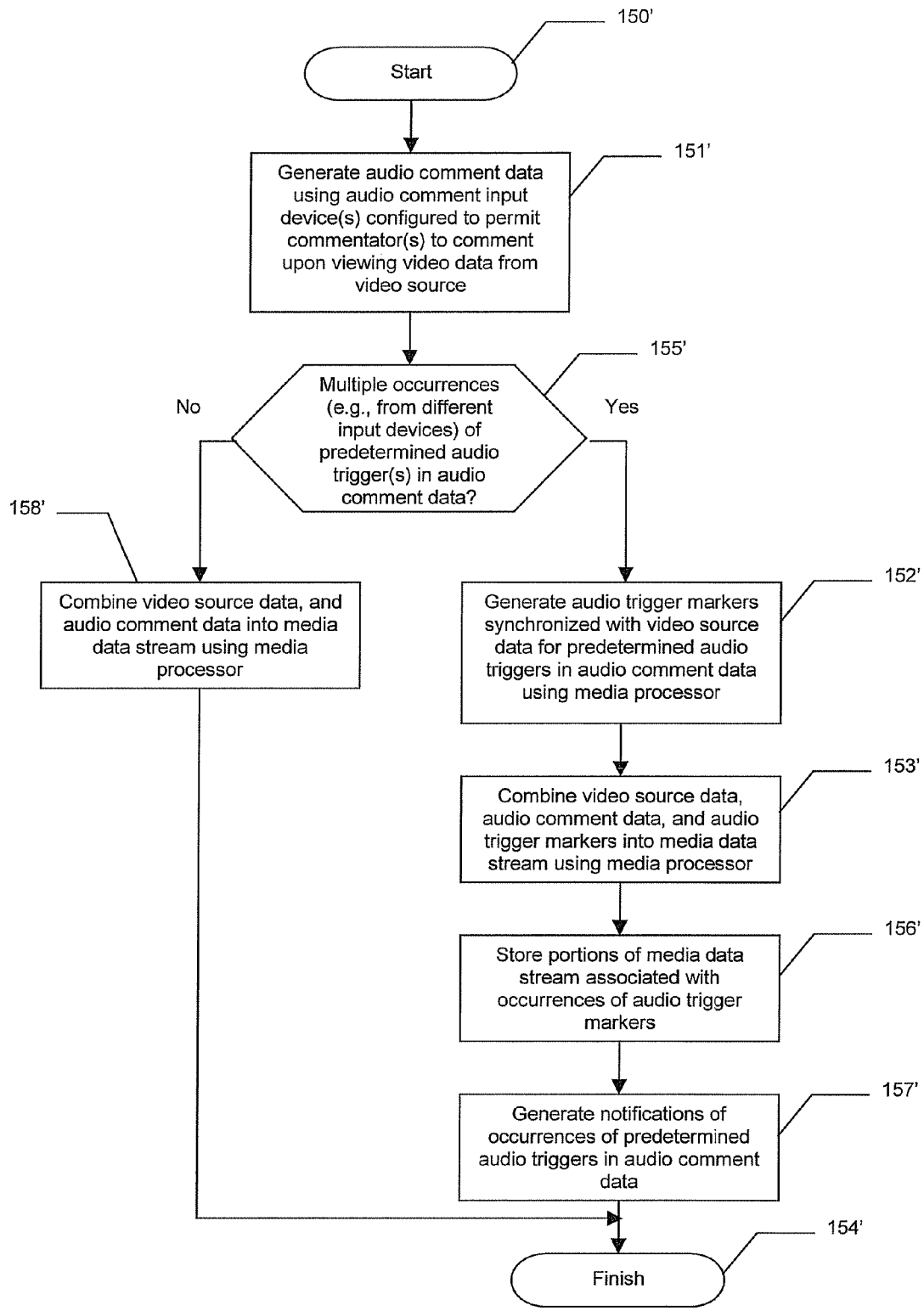

In the exemplary embodiment illustrated in FIG. 7, a plurality of audio comment input devices 141a'-141n' are used by respective commentators 132a'-132n', and the media processor 134' may be further configured to generate the audio trigger markers based upon multiple occurrences of predetermined audio triggers within a set time, either from the same or from different audio comment input devices, for example, at Blocks 155', 152'. This may advantageously increase the confidence rate of a true occurrence of a desired event, etc., such as when a second analyst or commentator confirms that a particular item has been found or is present in the video feed, for example.

The media processor 134' may further be configured to store portions of the media data stream associated with occurrences of the audio trigger markers. In accordance with one exemplary application, audio trigger markers may be used as part of a video recording system to record and mark only those portions of a video data feed that pertains to a particular trigger. For example, the system may be implemented in a digital video recorder in which television programs are recorded based on audio content (e.g., audio keywords or phrases) as opposed to title, abstract, etc. For instance, users may wish to record recent news clips with commentary about their favorite celebrity, current event, etc. Users may add the name of the person or event of interest as a predetermined audio trigger. The media processor 134' advantageously monitors one or more television channels, and once the trigger is "heard" then the user may be optionally notified through a popup window on the television, etc. Other notifications may also be used, such as email or SMS messages, for example. The system 130' also advantageously begins recording the program and multiplexes the audio trigger markers into the video data. Afterwards, users can search the recorded or archived multimedia programs for triggers and be cued to the exact location(s) of the video feed when the predetermined audio trigger occurred.

By way of example, the media processor 134 may begin recording upon the occurrence of the predetermined audio trigger and record until the scheduled ending time for the program. Alternately, the media processor 134 may record for a set period of time, such as a few minutes, one half hour, etc. In some embodiments where the digital video recorder keeps recently viewed program data in a data buffer, the media processor 134 may advantageously "reach back" and store the entire program from its beginning for the user, as will be appreciated by those skilled in the art.

In addition, in some embodiments the media processor 134' may advantageously be configured to generate notifications based upon occurrences of the predetermined audio triggers in the audio comment data, as noted above, at Block 157'. Again, such occurrences may include popup windows on the display of one or more users or supervisors, email or SMS notifications, automated phone messages, etc., as will be appreciated by those skilled in the art. In those portions of video/audio data where no predetermined audio triggers are found, the video source data and audio comment data may still be combined into the media data stream without audio trigger markers, at Block 158', as will be appreciated by those skilled in the art. This is also true of the system 30' discussed above, i.e., the video source data may still be combined with audio data (if present) in a media transport stream even when there is no shared text comment data available.

In this regard, in some embodiments portions of the systems 30 and 130 may be implemented or combined together. For example, in the system 130' a plurality of text comment input devices 131a'-131n' are included and configured to permit commentators 132a'-132n' to generate shared text comment data based upon viewing the video data, as discussed above. That is, the media processor 134' may advantageously generate the above-described database of shared text comment data indexed in time with the video source data, in addition to audio trigger markers based upon occurrences of predetermined audio triggers. Here again, the media processor may be implemented as a media server including a processor 139' and a memory 140' cooperating therewith to perform the above-described functions.

The above-described system and methods therefore provide the ability to automatically add valuable information in real time to accompany video data without adding unwanted chatter. The stream with the event markers may be valuable for rapidly identifying important events without the need for an operator or user to watch the entire archived or stored video. Moreover, this approach advantageously provides an efficient way to combine or append valuable audio annotations to a live or archived video, which allows users of the video to see a popup window or other notification of the triggers as the video is played, as well as search for and be cued at the audio trigger points rather than watching an entire video.

A related physical computer-readable medium may have computer-executable instructions for causing the media processor 34 to perform steps including processing the video source data and audio comment data, and generating therefrom audio trigger markers synchronized with the video source data for predetermined audio triggers in the audio comment data. A further step may include combining the video source data, the audio comment data, and the audio trigger markers into a media data stream, as discussed further above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A multimedia system comprising:
   a plurality of audio comment input devices; and
   a media processor cooperating with said plurality of audio comment input devices and configured to
   generate audio comment data based upon audio input from commentators using respective audio comment input devices, the commentators viewing common video data from a video source,
   locate multiple occurrences of predetermined audio keywords in the audio comment data within a set time and from different audio comment input devices and, responsive thereto,
   generate respective audio trigger markers synchronized with the video source data for the located predetermined audio keywords, and
   combine the audio trigger markers with the video source data and the audio comment data into a media data stream.

2. The multimedia system of claim 1 wherein said media processor is further configured to store portions of the media data stream associated with occurrences of the audio trigger markers.

3. The multimedia system of claim 1 wherein said media processor combines the video data feed, the audio data feed, and the audio trigger markers by multiplexing to generate the media data stream.

4. The multimedia system of claim 1 wherein said media processor is further configured to generate notifications based upon occurrences of the predetermined audio keywords in the audio comment data.

5. The multimedia system of claim 1 further comprising a plurality of text comment input devices configured to permit a plurality of commentators to generate shared text comment data based upon viewing the video data; and wherein said media processor is further configured to process the video source data and shared text comment data and generate therefrom a database comprising shared text comment data indexed in time with the video source data so that the database is searchable by text keywords to locate corresponding portions of the video source data.

6. The multimedia system of claim 1 wherein said media processor comprises a media server.

7. The multimedia system of claim 6 wherein said media server comprises a processor and a memory cooperating therewith.

8. A multimedia data processing method comprising:
   generating audio comment data based upon audio input from commentators using respective audio comment input devices, the commentators viewing common video data from a video source;
   locating multiple occurrences of predetermined audio keywords in the audio comment data within a set time and from different audio comment input devices and, responsive thereto;
   generating respective audio trigger markers synchronized with the video source data for the located predetermined audio keywords; and
   combining the audio trigger markers with the video source data and the audio comment data into a media data stream using the media processor.

9. The method of claim 8 further comprising storing portions of the media data stream associated with occurrences of the audio trigger markers using the media server.

10. The method of claim 8 wherein combining comprises multiplexing the video data feed, the audio data feed, and the audio trigger markers to generate the media data stream.

11. A non-transitory computer-readable storage device having computer-executable instructions for causing a media processor to cooperate with a plurality of audio comment input devices to perform steps comprising:

generating audio comment data based upon audio input from commentators using respective audio comment input devices, the commentators viewing common video data from a video source;

locating multiple occurrences of predetermined audio keywords in the audio comment data within a set time and from different audio comment input devices and, responsive thereto, generating respective audio trigger markers synchronized with the video source data for the located predetermined audio keywords; and combining the audio trigger markers with the video source data and the audio comment data into a media data stream.

12. The non-transitory computer-readable storage device of claim 11 further comprising computer-executable instructions for causing the media processor to perform a step of storing portions of the media data stream associated with occurrences of the audio trigger markers using the media server.

13. The non-transitory computer-readable storage device of claim 11 wherein combining comprises multiplexing the video data feed, the audio data feed, and the audio trigger markers to generate the media data stream.

\* \* \* \* \*